(12) United States Patent
Haronian

(10) Patent No.: US 11,577,553 B2
(45) Date of Patent: Feb. 14, 2023

(54) TIRE TREAD WEAR AND ROAD CONDITION MEASURING DEVICE

(71) Applicant: Enervibe Ltd., Hevel Eilot Regional Council (IL)

(72) Inventor: Dan Haronian, Efrat (IL)

(*) Notice: Subject to any disclaimer, the term of this patent is extended or adjusted under 35 U.S.C. 154(b) by 0 days.

(21) Appl. No.: 17/151,167

(22) Filed: Jan. 17, 2021

(65) Prior Publication Data
US 2022/0227183 A1 Jul. 21, 2022

(51) Int. Cl.
*B60C 11/24* (2006.01)
*B60C 19/00* (2006.01)

(52) U.S. Cl.
CPC .......... *B60C 11/246* (2013.01); *B60C 11/243* (2013.01); *B60C 19/00* (2013.01); *B60C 2019/004* (2013.01)

(58) Field of Classification Search
CPC ............ B60C 23/0435; B60C 23/0416; B60C 23/0489; B60C 23/0488; B60C 23/0415; B60C 23/0447; B60C 23/0494; B60C 23/062; B60C 23/0457; B60C 23/0459; B60C 23/0466; B60C 23/0471; B60C 23/0486; B60C 23/0408; B60C 23/20; B60C 23/0493; B60C 11/24; B60C 23/0401; B60C 23/0433; B60C 11/246; B60C 23/001; B60C 23/003; B60C 23/007; B60C 23/008; B60C 23/009; B60C 23/02; B60C 23/041; B60C 23/0413; B60C 23/0423; B60C 23/0461; B60C 23/0496; B60C 23/0498; B60C 23/061; B60G 2800/984; B60T 2240/06; B60T 2240/07; B60T 2240/08; E01F 9/696; F16D 2066/001; G01L 17/00; G01L 17/005; G01L 19/0092; G01L 19/08; G01L 19/083; G01L 19/086; G01L 5/28; G01L 7/166; G01B 11/22; G01B 2210/50; G01B 5/18; G01M 17/02; G01M 17/027; G01M 17/013; G02F 1/31; G02F 2203/12; H02S 10/12; H02S 20/21; H02S 20/22

See application file for complete search history.

(56) References Cited

U.S. PATENT DOCUMENTS

| | | | | |
|---|---|---|---|---|
| 6,794,886 B1* | 9/2004 | Chen | ......................... | G01B 7/06 |
| | | | | 324/693 |
| 6,989,675 B2* | 1/2006 | Kesil | ...................... | G01B 15/02 |
| | | | | 324/636 |
| 8,794,058 B2* | 8/2014 | Bigot | .................... | B60C 11/243 |
| | | | | 73/146 |
| 9,741,487 B2* | 8/2017 | Waffenschmidt | .... | H04B 5/0037 |
| 9,797,703 B2* | 10/2017 | Andrews | ............... | B60C 9/0007 |
| 11,014,413 B2* | 5/2021 | Räisänen | .............. | B60C 11/246 |

(Continued)

FOREIGN PATENT DOCUMENTS

CH 710455 A2 12/2020

*Primary Examiner* — Nimeshkumar D Patel
*Assistant Examiner* — Gedeon M Kidanu

(57) ABSTRACT

A tire with a treads depth measuring device that includes a first electrode and a second electrode that are fixed to internal surface of the tire, and an oscillator that is electrically connected to the electrodes so that capacitance between the electrodes affects frequencies of the oscillator. Changes in frequencies of the oscillator can be used to detect and calculate changes in thickness of the tire and changes in depth of treads in the tire.

8 Claims, 15 Drawing Sheets

(56) References Cited

U.S. PATENT DOCUMENTS

| | | | |
|---|---|---|---|
| 2005/0252285 A1* | 11/2005 | Boehm | G01N 27/221 |
| | | | 73/146 |
| 2012/0011926 A1 | 1/2012 | Bigot | |
| 2014/0166168 A1* | 6/2014 | Engel | B60C 11/243 |
| | | | 342/385 |
| 2014/0333329 A1* | 11/2014 | Jeong | G01B 7/085 |
| | | | 361/748 |
| 2014/0365069 A1* | 12/2014 | Orlewski | B60C 11/0302 |
| | | | 73/146 |
| 2017/0307349 A1* | 10/2017 | Andrews | G01M 17/02 |
| 2020/0300599 A1* | 9/2020 | Andrews | B60C 25/007 |
| 2020/0400420 A1* | 12/2020 | Cummer | B60C 25/007 |

\* cited by examiner

| Material | Dielectric Constant |
|---|---|
| Sand (dry) | 3 - 6 |
| Sand (saturated) | 20 - 30 |
| Silts | 5 - 30 |
| Shales | 5 - 15 |
| Clays | 5 - 40 |
| Humid soil | 30 |
| Cultivated soil | 15 |
| Rocky soil | 7 |
| Sandy soil (dry) | 3 |
| Sandy soil (saturated) | 19 |
| Clayey soil (dry) | 2 |
| Clayey soil (saturated) | 15 |
| Sandstone (saturated) | 6 |
| Limestone (dry) | 7 |
| Limestone (saturated) | 4 - 8 |
| Basalt (saturated) | 8 |
| Granite (dry) | 5 |
| Granite (saturated) | 7 |

Figure 12

TIRE TREAD WEAR AND ROAD CONDITION MEASURING DEVICE

BACKGROUND OF THE INVENTION AND PRIOR ART

Automotive industry is constantly progressing, and fully autonomous vehicles are soon to appear on the roads. The need to monitor tires condition in vehicles is essential for fuel saving, for lowering downtime and to reduce accidents caused by malfunctioning tires. This need is critical especially for autonomous vehicles that are typically unmanned and therefore lack a human visual inspection. Tire tread thickness and tire aging are two parameters that determines tire wear out and are essential for tire health monitoring.

Tyrata patent number U.S. Pat. No. 9,797,703 B2, shown in FIG. 1, includes transmitting an oscillating signal from a first pad, through the material with some dielectric property, to a second pad, and measuring the signal reflected to the first pad. The frequency of the signal is varied over time so that the frequency response of the system (the first pad, the material, and the second pad) may be analyzed and the resonant frequency of the system is determined. The thickness of the material is determined by the resonant frequency. The method therefore requires a frequency scanning and correlating the specific frequency to the tread depth.

Goodyear patent number US 2014/0365069 A1 offers a tread wear indicator inserted inside a tire as shown in FIGS. 2a, 2b and 2c The indicator is constructed as a plurality of radially stacked sensor elements operatively configured and located to sequentially sacrificially abrade and change in electrical resistance responsive to a progressive tread wear of the respective tread element. The sensor elements are connected by circuitry that communicates a data signal from the sensor elements to a data processor indicative of a change in cumulative resistivity of the sensor elements. The data processor receives the data signal from the sensor elements and determines a radial wear level of the tread element based on the data signal. Multiple tread wear indicators may be mounted to respective tread lugs across the tread to derive a tread wear status based upon the tread wear profiles of the respective lugs.

Goodyear patent number U.S. Pat. No. 7,578,180B2, offers an indirect tire wear measurement based on the tire inflation pressure, the tire vertical vibration frequency, and the tire vertical vibration resonance wherein the tire wear estimation is correlated to the and the tire vertical vibration resonance at different tire pressure.

Infineon patent number U.S. Pat. No. 7,762,129 B2, offers a tire tread sensing system including a magnetic field sensor and a magnetic field source configured to magnetize magnetizable particles embedded in a tire tread. The magnetic field sensor is configured to measure a magnetic field strength associated with the magnetic field source and the magnetizable particles, and the magnetic field strength is indicative of a tire tread depth. Alternatively, the particles comprise alternating permanent magnets embedded in a tread portion of a tire. Such a method requires a special tire with magnetic particles.

Patent number WO2009095113A1 offers A method for determining a tire tread depth from using a sensor placed on the inside of the tire that measures the length of the contact patch of the tire. As the tire wear out it thickness decrease and so is the width of the contact patch. The tire tread therefor depends on the contact patch. The problem is that the contact patch is also a function of the tire pressure, the load on the tire and therefore extracting the tire wear may be hard.

SUMMARY OF THE INVENTION

This invention is related to measuring tire tread thickness and tire wear. The invention uses an oscillator connected to a tire such that the oscillator frequency depends on the capacitance between the electrodes and such that the frequency is a measure to the tread height or tire aging.

This invention describes a measuring device for measuring tire tread height and tire aging. The measuring device uses at least two electrodes affixed to the inside of the tire and are connected to an oscillator such that the oscillator frequency depends on the capacitance between two electrodes. As the tread height deceased and as the tire ages, the capacitance between electrodes change which changes the oscillator frequency that serves as an indicator to the tread height and to the tire aging condition. Multiple electrodes may be used together with a switching box that sequentially connects two electrodes to an oscillator in order to determine the oscillator frequency that is associated with the two electrodes. The ratio between the different frequencies may be used as a measure of the tread height.

BRIEF DESCRIPTION OF THE DRAWINGS

The intention of the drawings attached to the application is not to limit the scope of the invention and its application. The drawings are intended only to illustrate the invention and they constitute only one of its many possible implementations.

FIG. 8b shows a graph of measurements of frequencies of oscillator based on a 555 timer chip connected to different adjacent electrodes in the array described in FIG. 8a.

FIG. 8c shows a graph of the $F_{ij}$ of adjacent electrode described in FIG. 8a.

FIG. 12 shows a table of dielectric constant of different earth materials.

DETAILED DESCRIPTION OF THE INVENTION

This patent application is on a tire with a device that is designed to check a condition of the tire or a road. The device comprise at least two electrodes fixed to internal surface of the tire, and an oscillator that is electrically connected to the electrodes either directly or through a switching box in case there are more than two electrodes. The oscillator is designed such that the capacitance between the electrodes affects frequency of the oscillator. In turn, the capacitance between the electrodes depends on the tire properties, its height and on road condition such as wetness, snow, ice, or sand.

Figure 1:
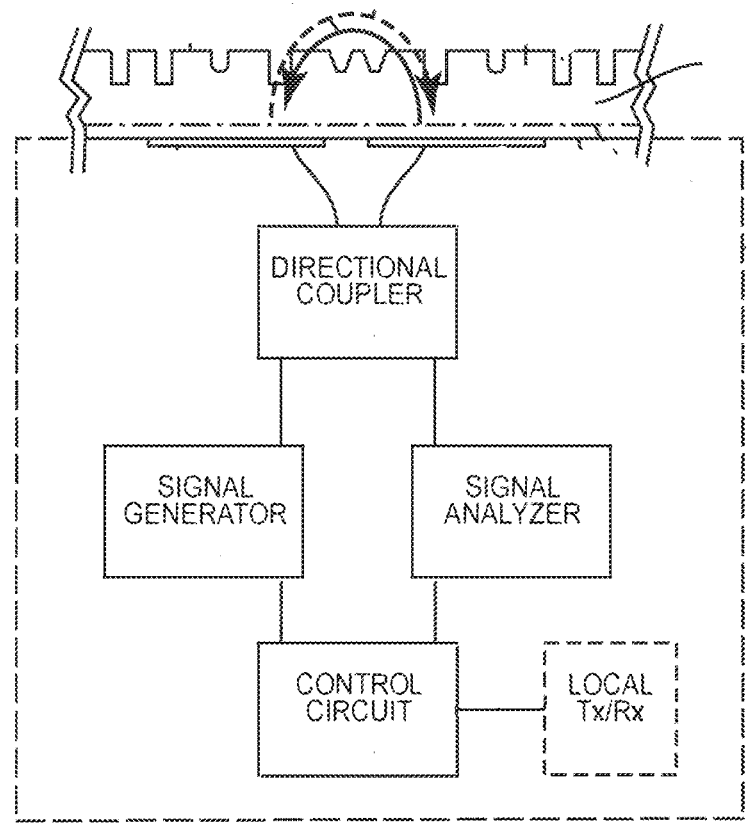
FIG. 1 illustrates a part of a tire with two pads.
Figure 2A:
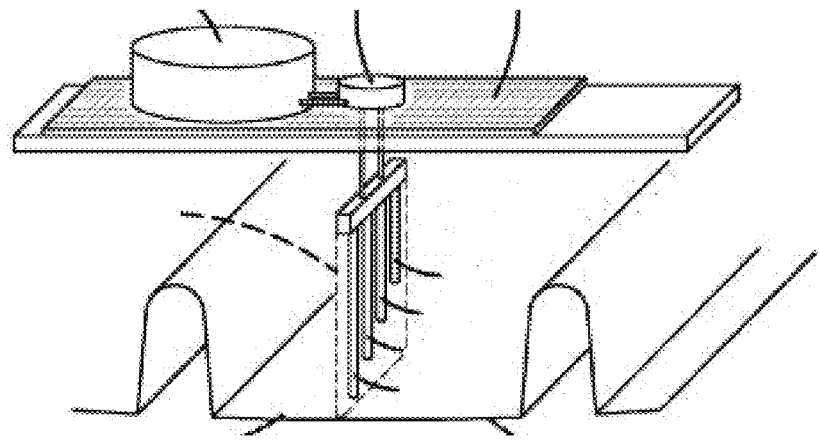
FIGS. 2a-2c illustrate a part of a tire with an indicator.
Figure 2B:
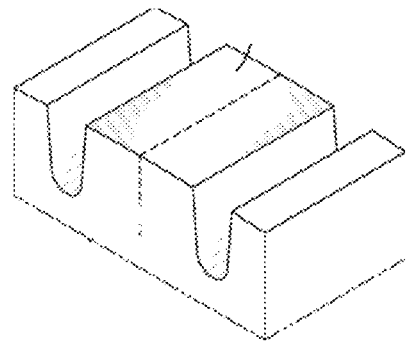
Figure 2C:
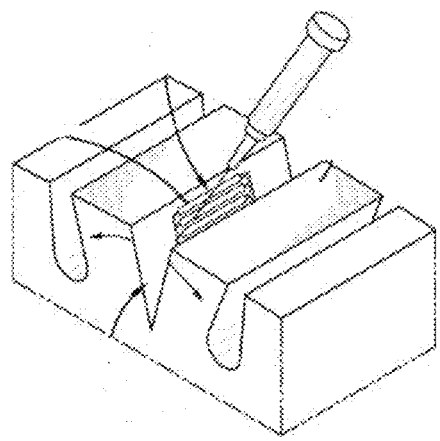
Figure 3:
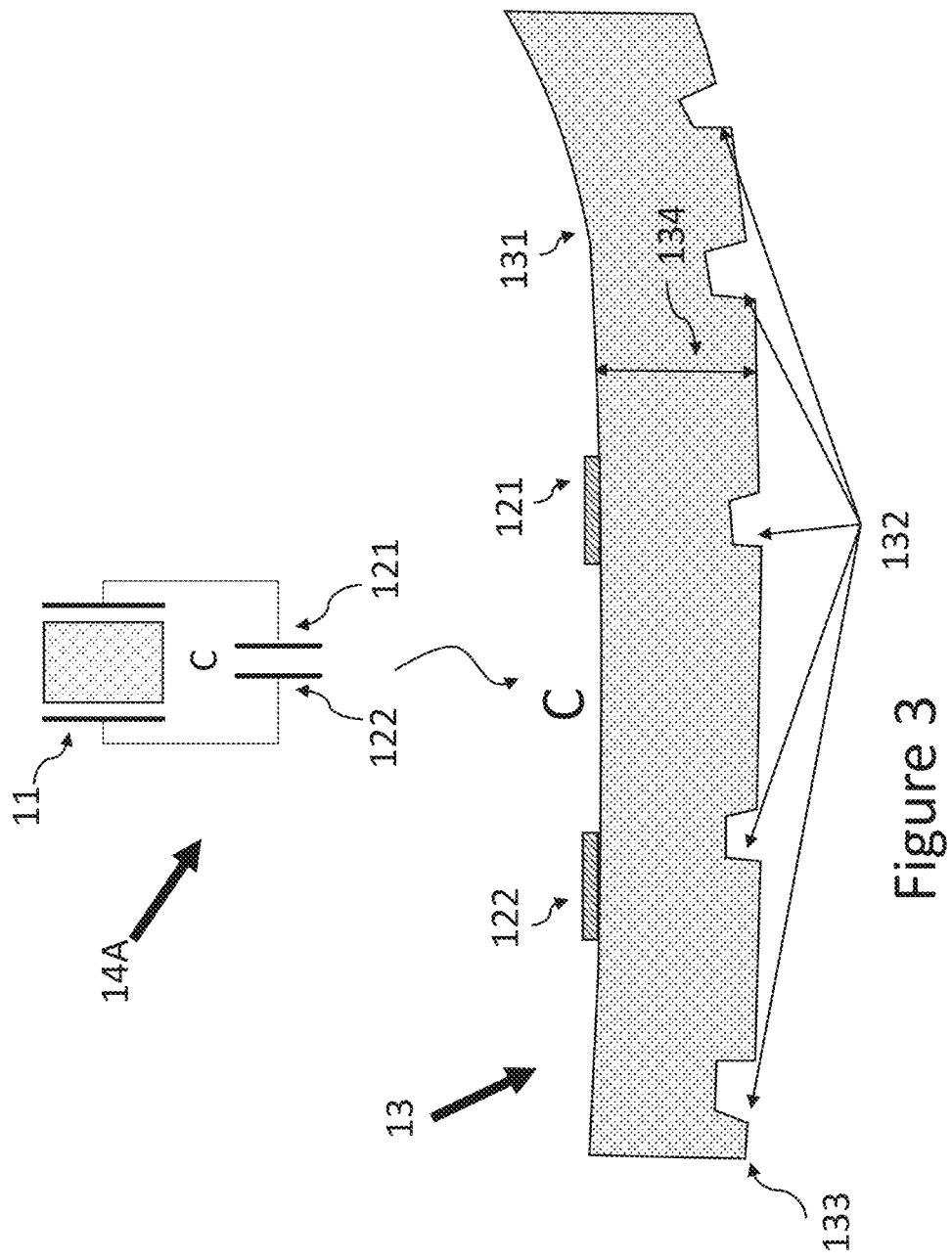
FIG. 3 depicts schematically a tire (13) with a treads depth measuring device (14A).

FIG. 3 describes schematically a general embodiment of this invention. In this embodiment a device for measuring tire thickness (14A) comprising an oscillator (11) connected to two electrodes (121, 122) fixed to the inside (131) of a tire (13) that may have treads (132) on its outside (133) side. Changes in rubber properties such as its dielectric constant (c) or thickness of the tire (134) change the capacitance between electrodes (121) and (122), which in turn changes the frequency of the oscillator. The change in the oscillator frequency may be used to evaluate the tire wear.

Figure 4A:
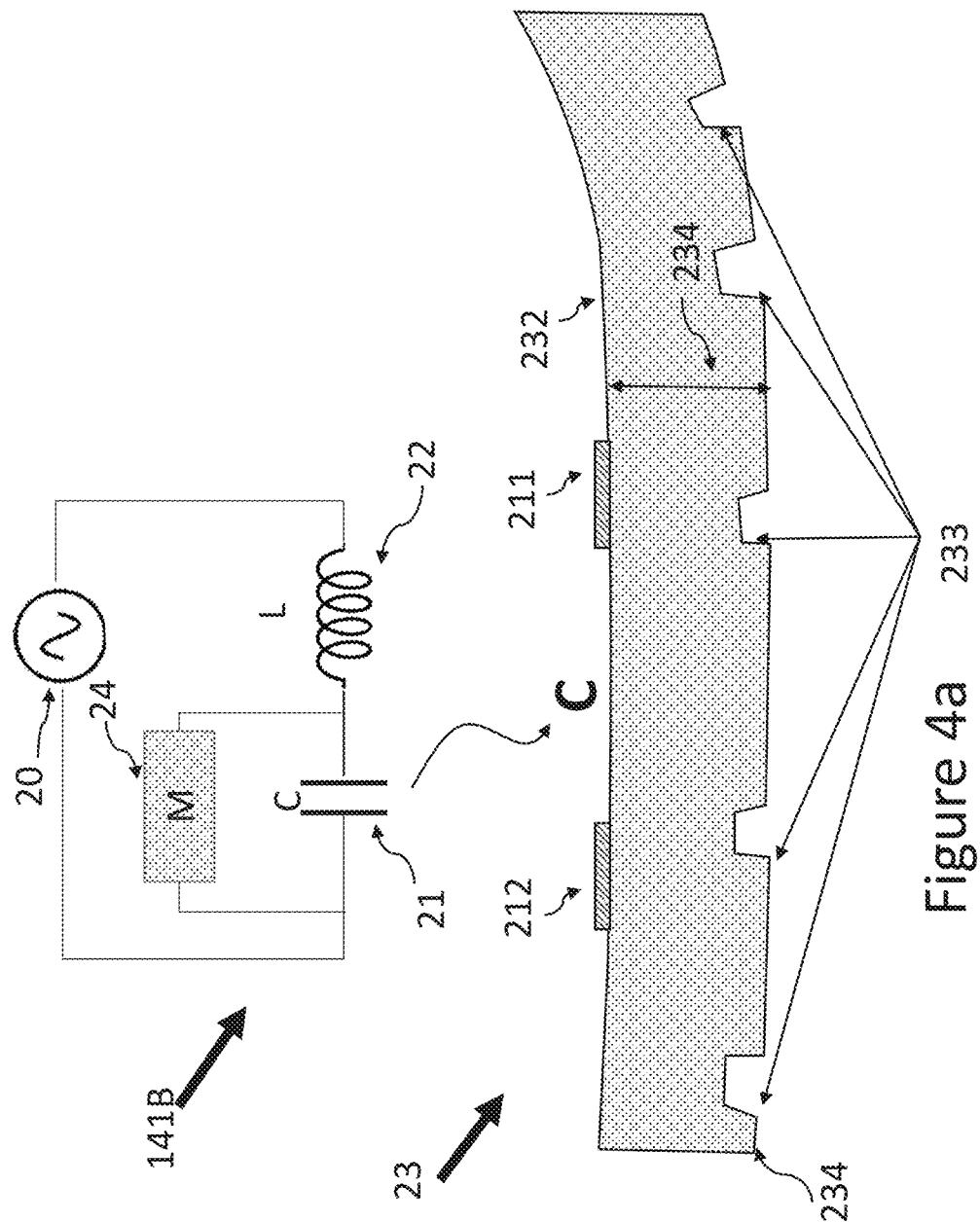
FIG. 4a depicts schematically a tire (23) with a treads depth measuring device (141B).

Another embodiment of this invention is shown in FIG. 4a. Here a device for measuring tire thickness (14B) comprising a capacitor C (21) and inductor L (22) forming an LC resonator. The capacitor is formed between two electrodes (211, 212) fixed to the inside (232) of a tire (23) that may have treads (233) on its outer side (234). The resonance frequency of the resonator is $$f_r = \frac{1}{2\pi\sqrt{LC}}.$$

A power source (20) is connected in series to the inductor and to the capacitor. The power source is an oscillating voltage source such that by sweeping the oscillating frequency of the voltage source a peak in the voltage drop is found for example by measuring the voltage drop on the capacitor or on the inductor. In the embodiment shown in FIG. 4b the voltage on the capacitor is measured using a meter (24) connected to the capacitor. Since L is known and $f_r$ is found from sweeping the frequency spectrum, C can be determined, as well as changes in C that reflects tire wear such as change in tire thickness (234) or change in tire properties such as the tire dielectric constant.

Figure 4B:
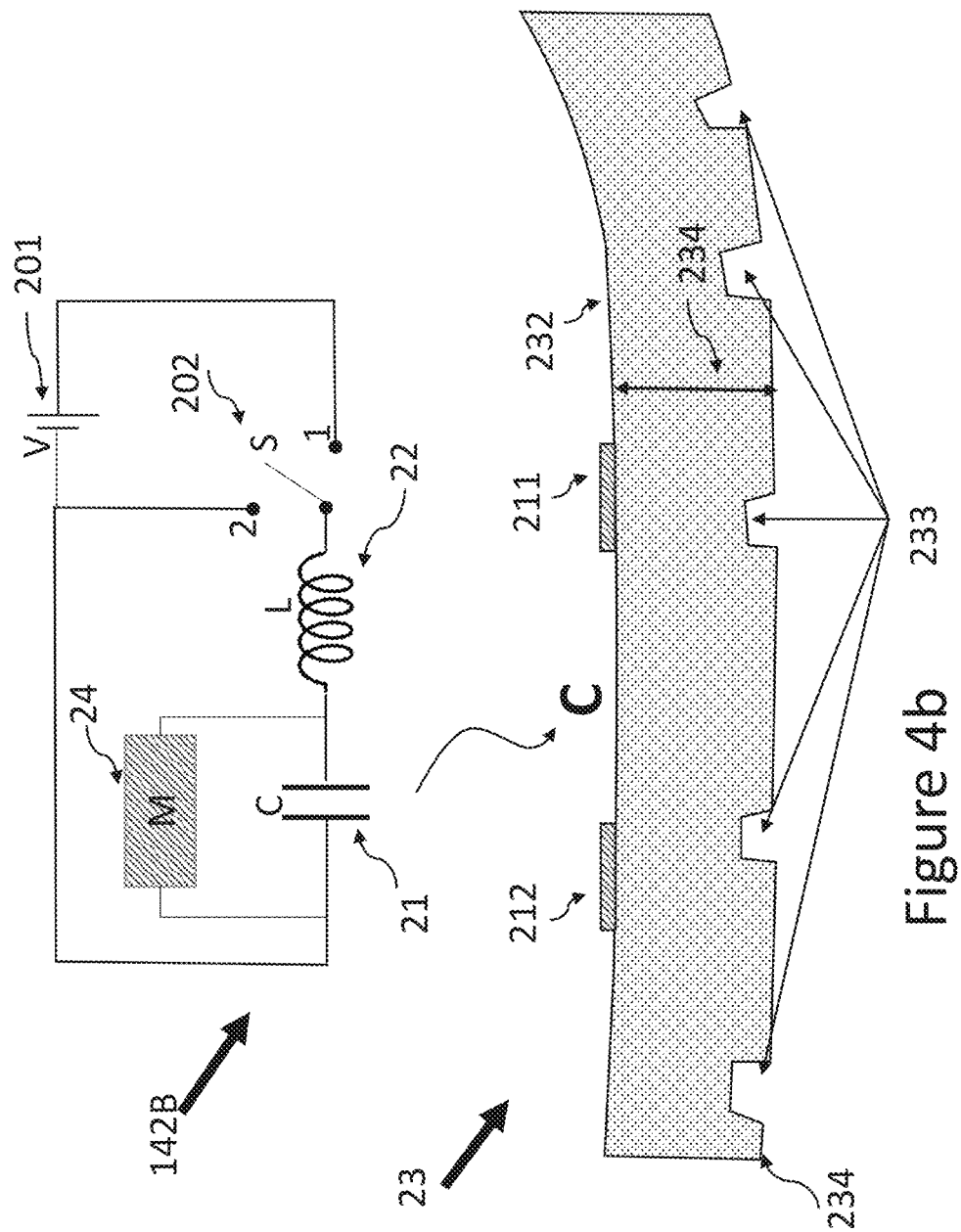
FIG. 4(b) depicts schematically a tire (23) with a treads depth measuring device (142B).

In another embodiment of the embodiment descried in FIG. 4b, the power source (201) is a DC voltage source. By flipping switch (202) to state 1, the power source is connected to the inductor and capacitor circuit and the capacitor is charged to voltage V of the DC voltage source. Flipping switch (202) to state 2 disconnect the power source and connect the capacitor to the inductor that excites a resonant oscillation of current flow between the inductor and the capacitor. Typically, these oscillation dies out as a results of internal resistance R of the inductor, the capacitor, and the wires. The resonance frequency is a function of the inductance L, the capacitance C and to small extent on the resistance R. Since the value of the inductor L is fixed and R is either fixed or negligible, it is possible to determine the capacitance between the two electrodes. Therefore, changes in the capacitance due to tire wear are reflected by changes in the resonance frequency. In another embodiment the inductor L, the capacitor C and the power source are connected to each other in parallel.

Figure 5:
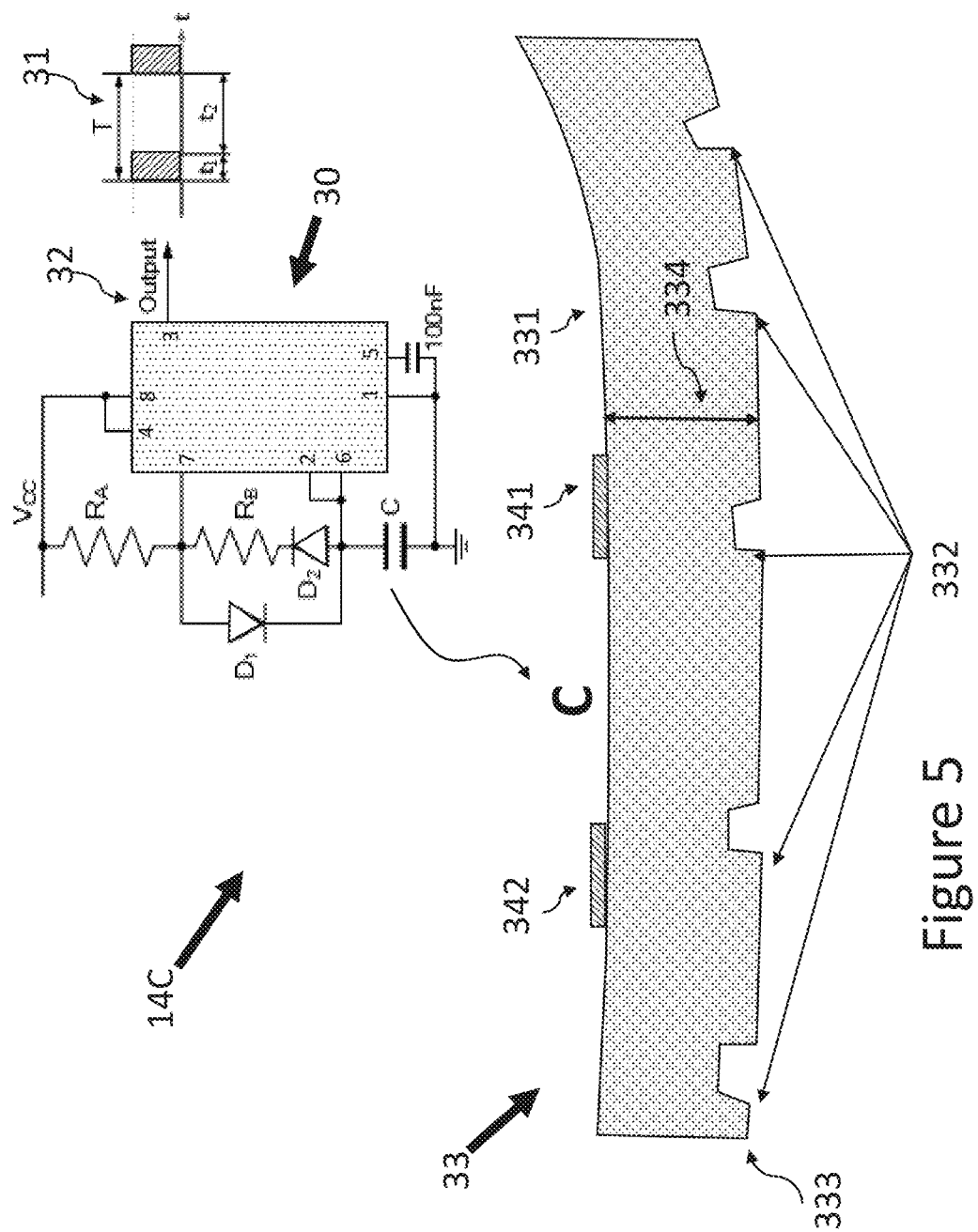
FIG. 5 depicts schematically a tire (33) with a treads depth measuring device (14C) that uses an oscillator based on 555 timer chip.

FIG. 5 describes another embodiment of a device for measuring tire thickness (14C) comprising a 555 timer chip (30) designed as an oscillator with oscillating frequency that depends on capacitance C, between electrodes (321) and (322) fixed to the inside (331) of a tire (33) that may have treads (332) on its outer side (333). The time interval T (31) at the output (32) from the 555 timer chip is $T=t_1+t_2=0.693R_AC+0.693R_BC$, and the frequency of the oscillator is $f=1/[0.693C(R_A+R_B)]$. Since $R_A$ and $R_B$ are known, the tire wear (334) may be determined through changes in the oscillating frequency of the oscillator due to change in the capacitance C:

$$df=-dc/[0.693C^2(R_A+R_B)].$$

Figure 6:
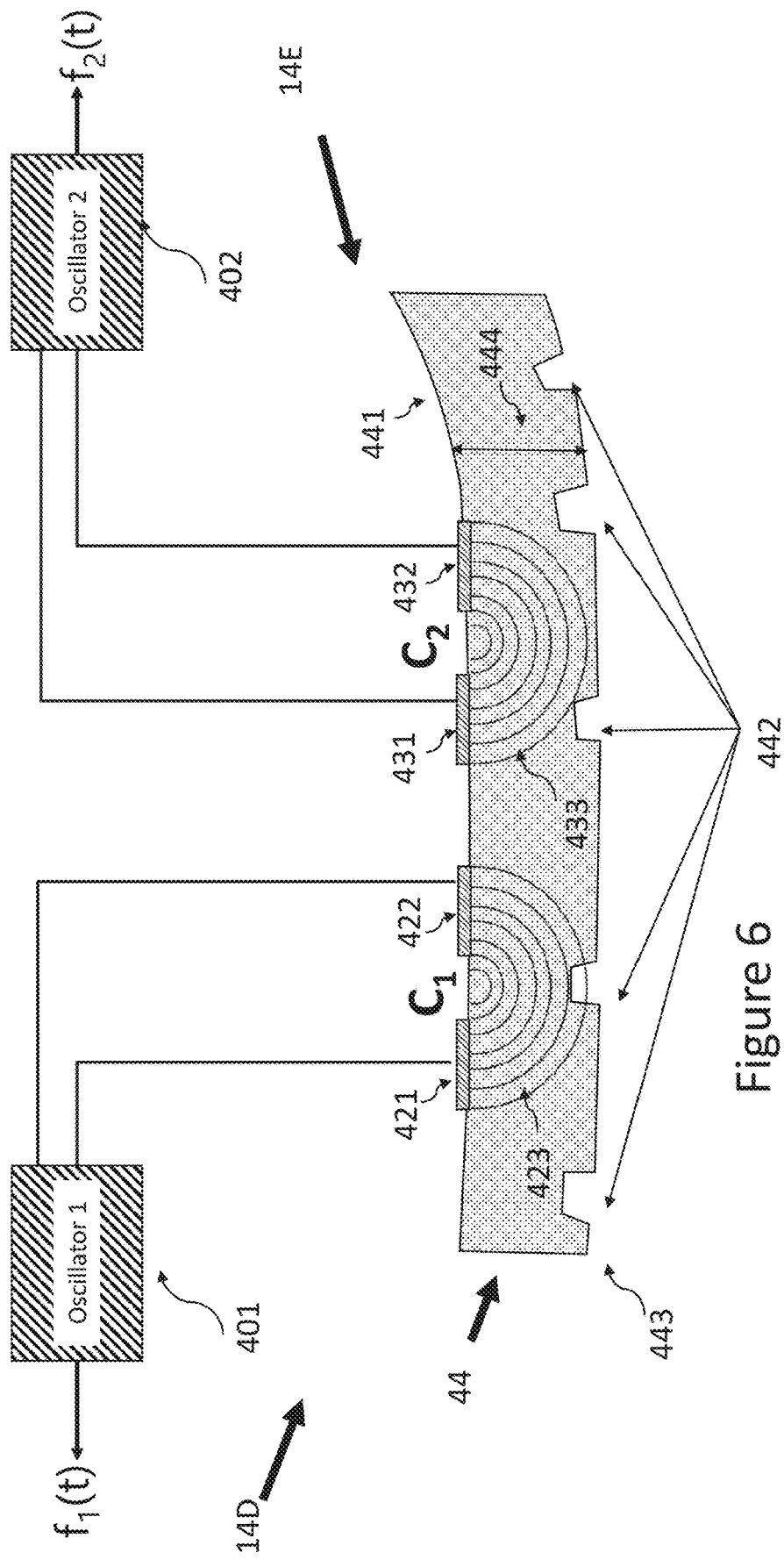
FIG. 6 depicts schematically a tire (44) with a tread depth measuring device that uses two oscillators (14D, 14E) and two sets of electrodes (421, 422) and (431, 432).

FIG. 6 describes an embodiment that uses two device for measuring tire thickness (14D) such that one device comprises an oscillator (401) connected to electrodes (421, 422) that are placed on the inside (441) of a tire (44) close to one of the treads (442), and the second device (14E) comprising an oscillator (402) connected to electrodes (431, 432) that are placed on the inside (441) of a tire (44) away from a tread. Because the dielectric constant of the rubber is higher than that of air, most of the electric field (423) between electrode (421) and electrode (422) will be in the rubber and part of the field will be in the air forming the tread. On the other hand, the electric field (433) between electrode (431) and electrode (432) propagates entirely inside the rubber. It is therefore understood that the capacitance $C_1$ between electrode (421) and electrode (422) is different than the capacitance $C_2$ between electrode (431) and electrode (432). $f_1(t)$ is the frequency of oscillator (401) that depends on the capacitance $C_1$ and $f_2(t)$ is the frequency of oscillator (402) that depends on the capacitance $C_2$. As the tire wears the thickness (444) of the rubber decreases which changes $f_1$ and $f_2$. $R_0=f_1(t_0)/f_2(t_0)$, is the ratio between the frequencies $f_1$ and $f_2$ of a new tire. $R(t)=f_1(t)/f_2(t)$, is the ratio between the frequencies $f_1$ and $f_2$ at time t. As the tire wears out the thickness of the tire decreases and $f_1(t)$ approaches $f_2(t)$ such that when the tread vanishes and $R(t)\sim 1$. The ratio $R(t)$ is therefore a measure of the tire tread thickness in the range between $R_0$ and 1.

If the oscillators are based on LC oscillator, we can write $$R_0 = \sqrt{\frac{LC_2}{LC_1}} = \sqrt{\frac{C_2}{C_1}} = \sqrt{\frac{\epsilon_0 \epsilon G_2}{\epsilon_0 \epsilon G_2}} = \sqrt{\frac{G_2}{G_2}},$$

where $\epsilon_0$ and $\epsilon$ are the dielectric constant of vacuum and of the tire material respectively, and G1 and G2 are a geometry function of the two capacitors respectively. Since $\epsilon$ is a function of temperature and tire condition, estimating the tire thickness through the ratio R is less sensitive to temperature and tire properties.

Figure 7:
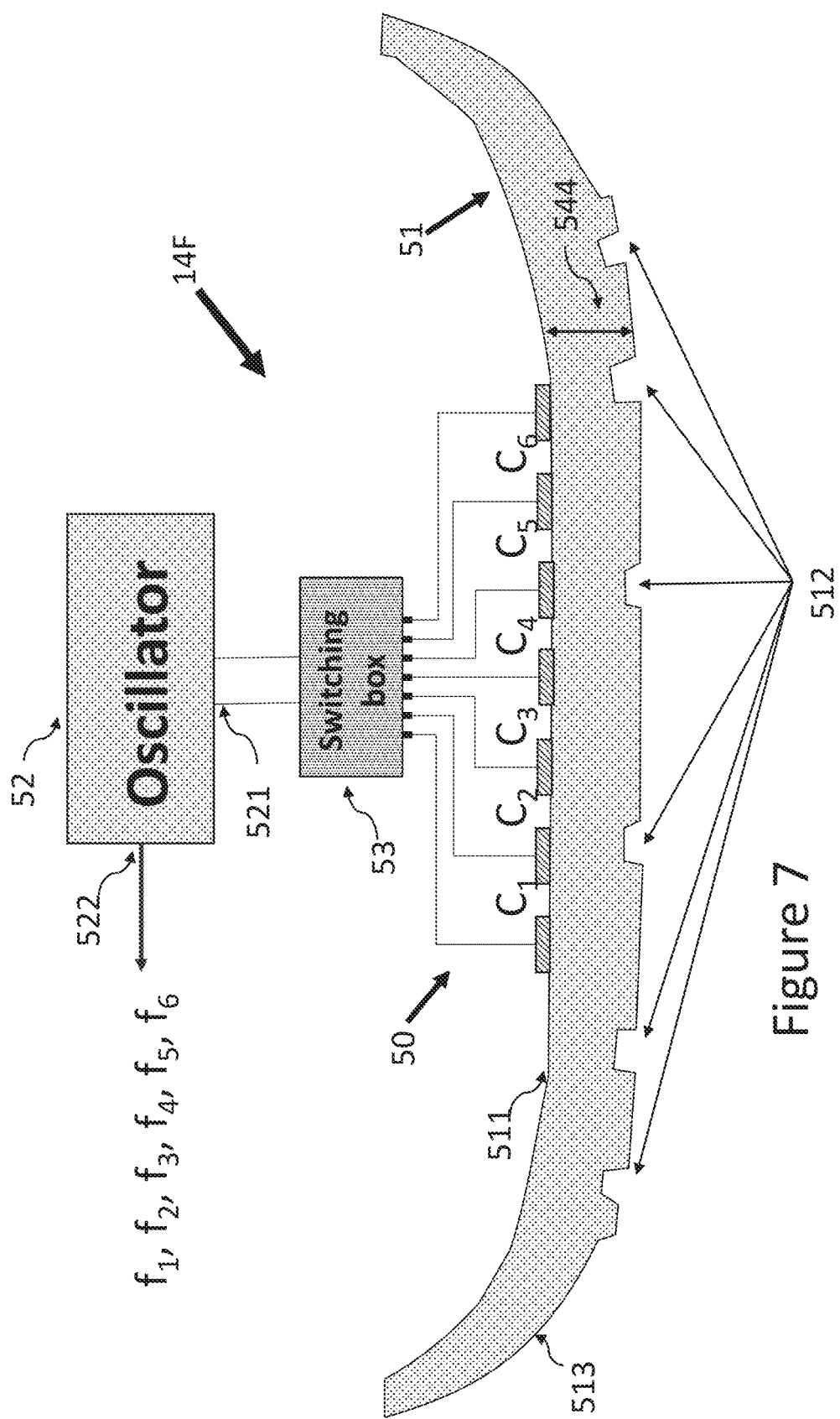
FIG. 7 depicts schematically a tire (51) with a treads depth measuring device (14F).

Fixing electrodes on the inside of a tire with high accuracy relative to the treads from the other side maybe hard. FIG. 7 is another embodiment of a device for measuring tire thickness (14F) comprising an oscillator (52) a switching box (53) and an array of array electrodes (50) fixed to the inside (511) of the tire (51) having treads (512) on the outside (513) of the tire. The electrodes are connected to the oscillator through the switching box that periodically connects two adjacent electrodes to the oscillator such that the oscillator outputs (522) a frequency that corresponds to the capacitance between the two electrodes.

$R_{ij}(0)=f_i(0)/f_j(0)$, and $R_{ij}(t)=f_i(t)/f_j(t)$, where i and j are indexes referring to adjacent, "0" refers to a new tire and "t" refer to tire at time "t" after installation and use.

As the tire wears out $R_{ij}(t) \to 1$.

The tire wear condition such as tire thickness (544) may be determined from the function $Fi_{ij}=(1-Abs(R_{ij}))$ such that as $Abs(R_{ij})$ approaches 1, $F_{ij}$ approaches 0.

The advantage of this tire wear sensing is that the array of electrodes can be fixed anywhere on the rubber as long as there are treads along the array.

Figure 8A:
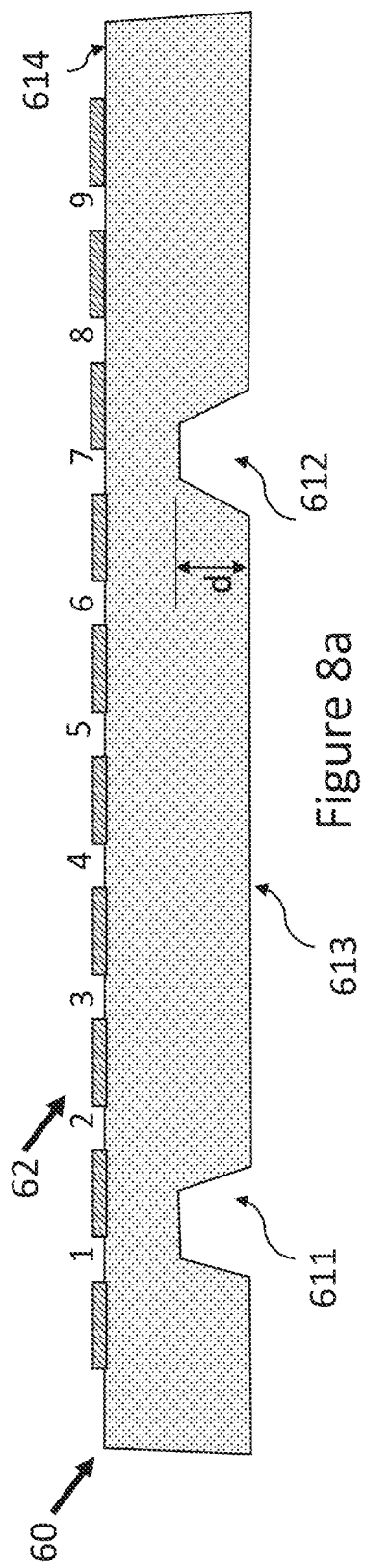
FIG. 8a depicts schematically a tire with several electrodes.

FIG. 8a shows schematically a cross section of a tire (611) with treads (612) and an array of 10 electrodes (60) fixed along of its width. The width of each electrode is 4 mm, its length is 30 mm and the gap between adjacent electrodes is 2 mm.

Figure 8B:
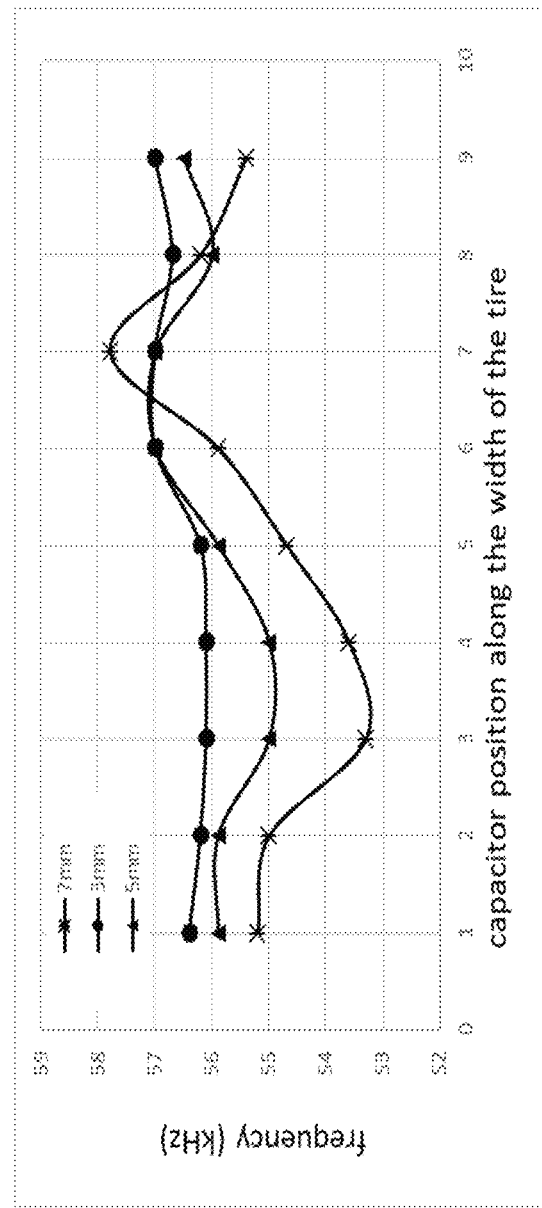
Figure 8C:
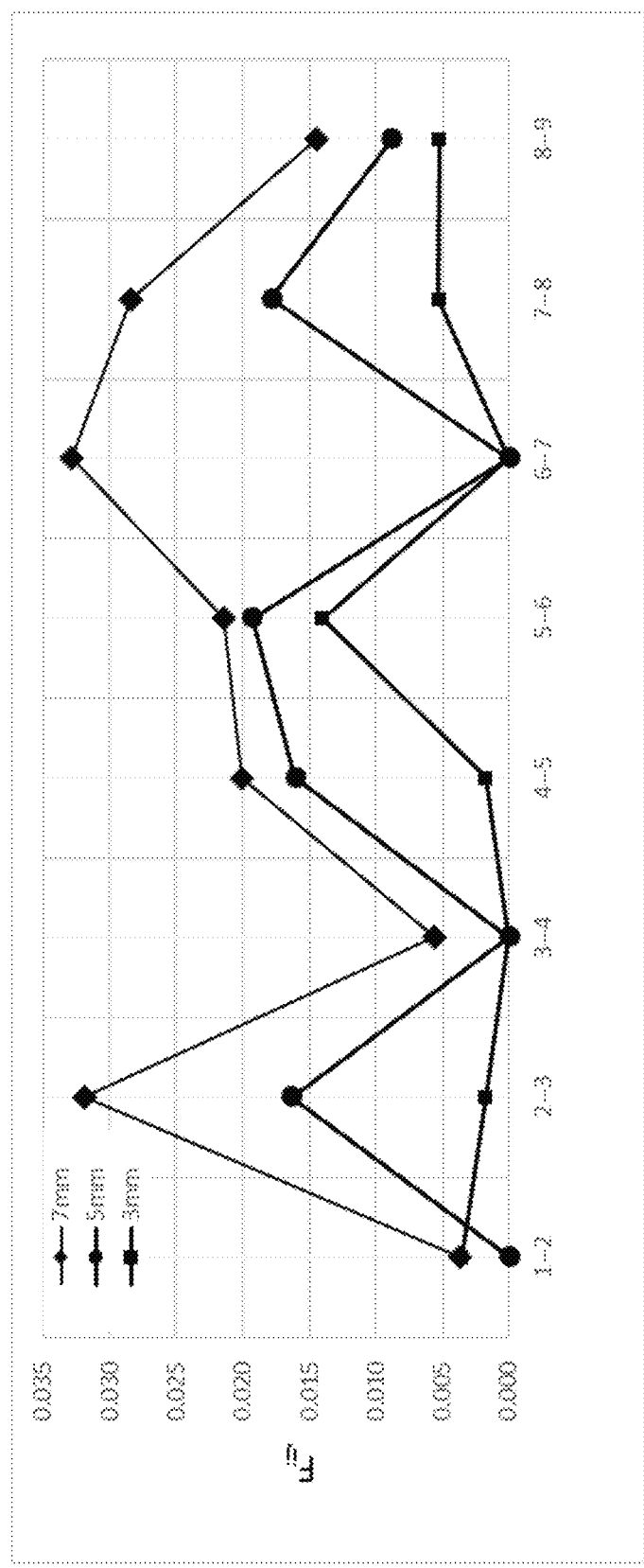

FIG. 8b is a graph of the oscillator frequency as a function of the capacitance between adjacent 10 electrodes, for tread thickness (d) of 7 mm, 5 mm and 2 mm. The oscillator is based on the 555 timer chip as described in FIG. 5. It is noted that as the tread thickness reduces, the frequency increases and gradually the frequency between adjacent electrodes come close to each other. FIG. 8c is a graph showing $F_{ij}$ of the measurement described in FIG. 8b, indicating that $F_{ij}$ approaches zero as the thickness of the tread decreases.

Tire degrades over time because of normal aging and because of environmental effects such has extreme high and low temperature condition. Byungwoo Moon, and others published their finding of rubber aging in a paper titled "Aging Behavior of Natural Rubber/Butadiene Rubber (NR/BR) Blends Using a Parallel Spring Model," Published online on Jun. 12, 2018 (doi: 10.3390/polym10060658). Their findings show aging of rubber due to change in moisture content as well as due to changes in the cross-linked structure and crosslink density. In addition, rubber hardens when exposed to sunlight and oxygen over a long period of time, which in turn affects the tensile properties of the rubber.

$C(t)=\varepsilon(t)G(t)$ where $\varepsilon(t)$ is the dielectric constant of the rubber which depends on the rubber chemistry and $G(t)$ depends on the specific geometry of the two electrodes. The phenomena described above mostly affect the dielectric constant, $\varepsilon(t)$, of the rubber and to some extent the geometry, $G(t)$, set by the electrodes.

Figure 9:
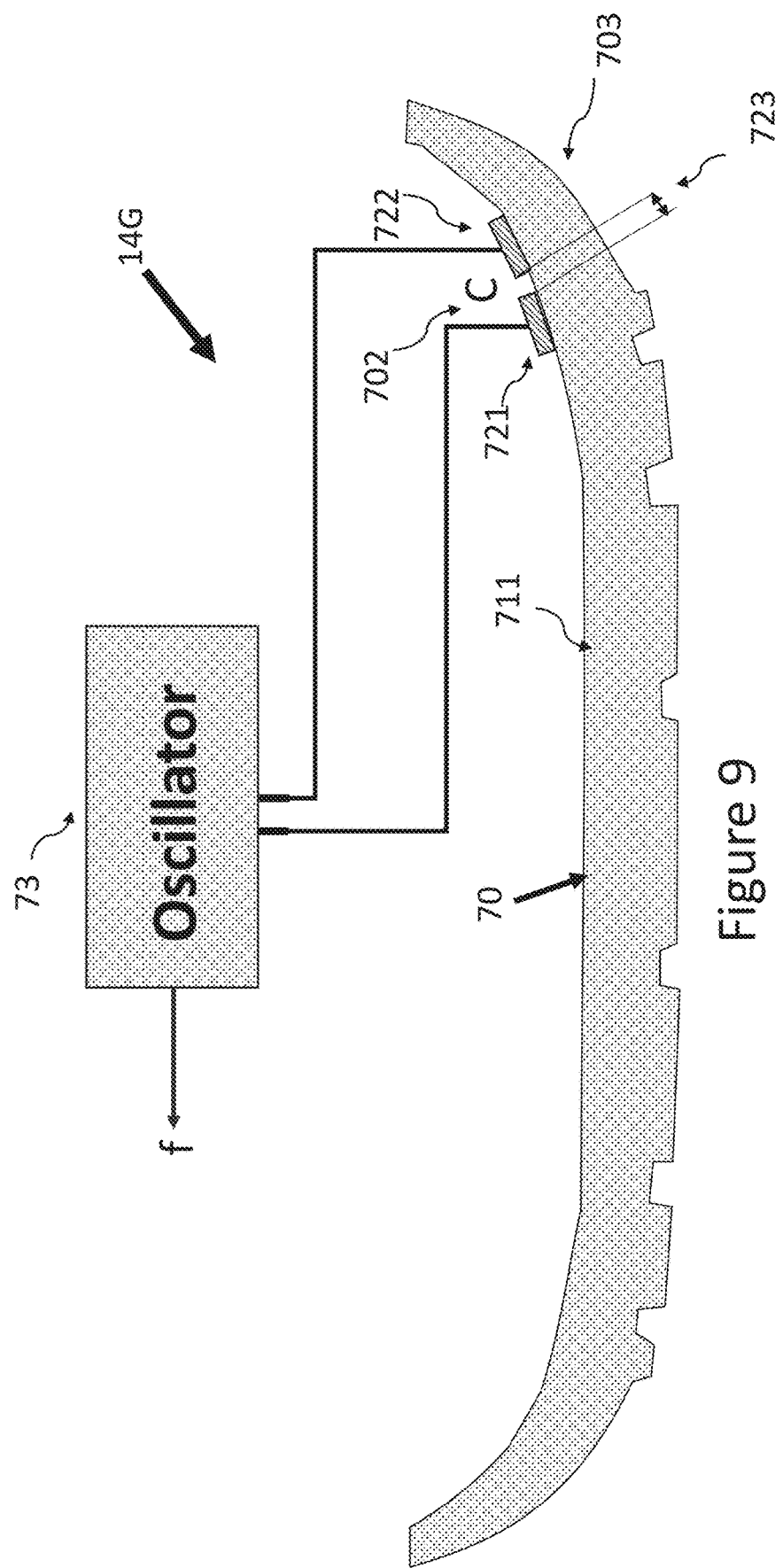
FIG. 9 depicts schematically a tire (70) with a treads depth measuring device (14G) that is attached to a section of the tire (703) that does not come into contact with the road.

FIG. 9 is an embodiment of a device for measuring tire thickness (14G) comprising an oscillator (73) and two electrodes, (721) and (722), fixed to the inside (711) of the tire (70) close to the sidewall of the tire (702) where the rubber on the outside of the tire (703) does not thin down during use. Since the thickness of the tire on the sidewall remain the same during the lifetime of the tire, changes in the frequency of the oscillator due to change in the capacitance between the two electrodes (721, 722) are mainly due to rubber aging. In addition, the tire starches cyclically during the rolling of the tire, leading to a cyclic change in the gap (723) between the two electrodes (721, 722). The starching may also involve a rapid decaying oscillation of the rubber leading to oscillation in the gap between the two electrodes. Since the tire elasticity change over time, the degree of starching as well as of the oscillations may change and be reflected in transient change in the capacitance between electrodes (721, 722) that in turns, leads to a transient change in the frequency of the oscillator. These changes may be used as measure to the tire level of aging.

It is understood that embodiment shown in FIG. 9 and FIG. 7, may be combined to offer full prediction of tire wear.

Figure 10A:
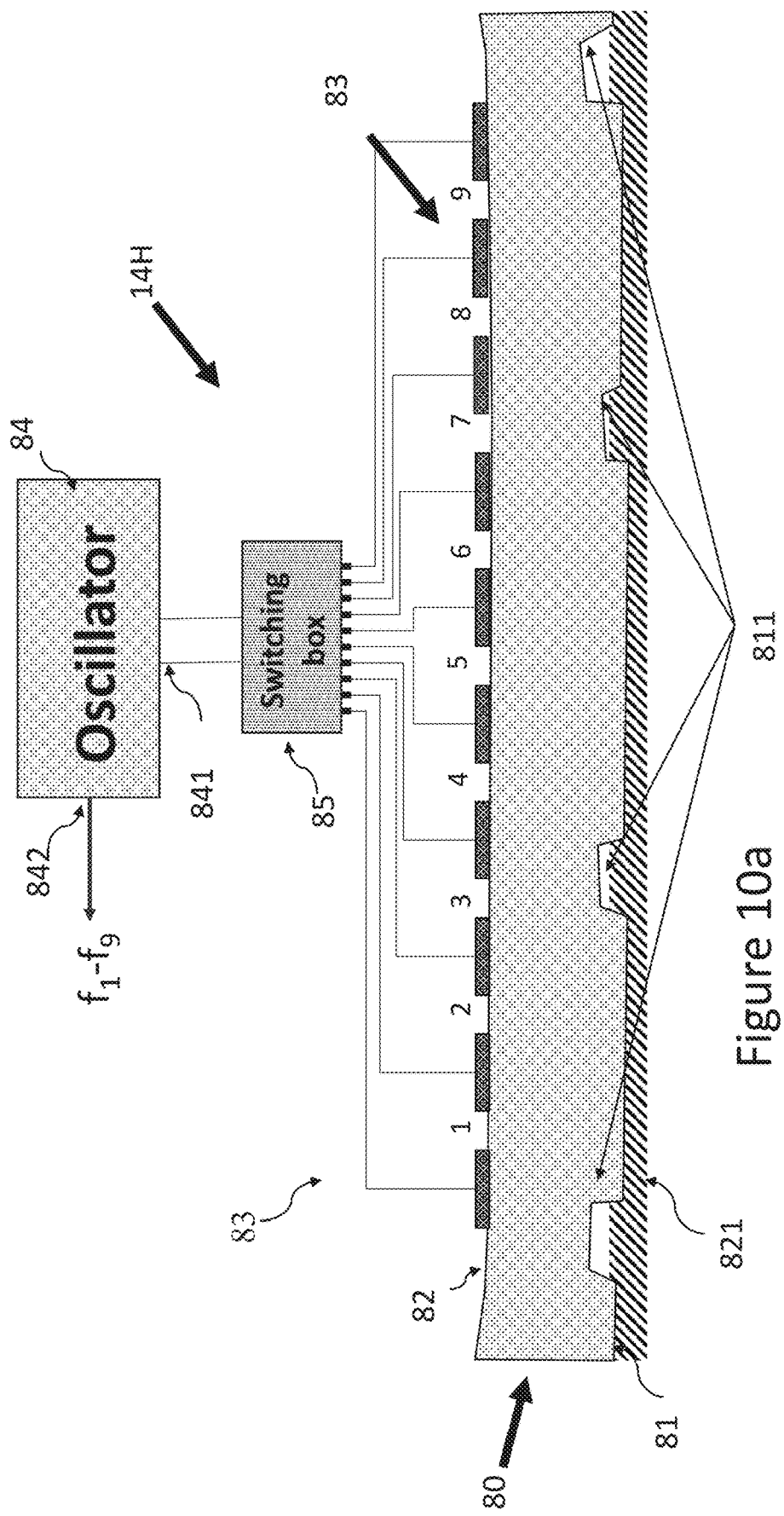
FIG. 10a schematically depicts a tire (82) with a system for detecting and measuring road conditions (14H).
Figure 10B:
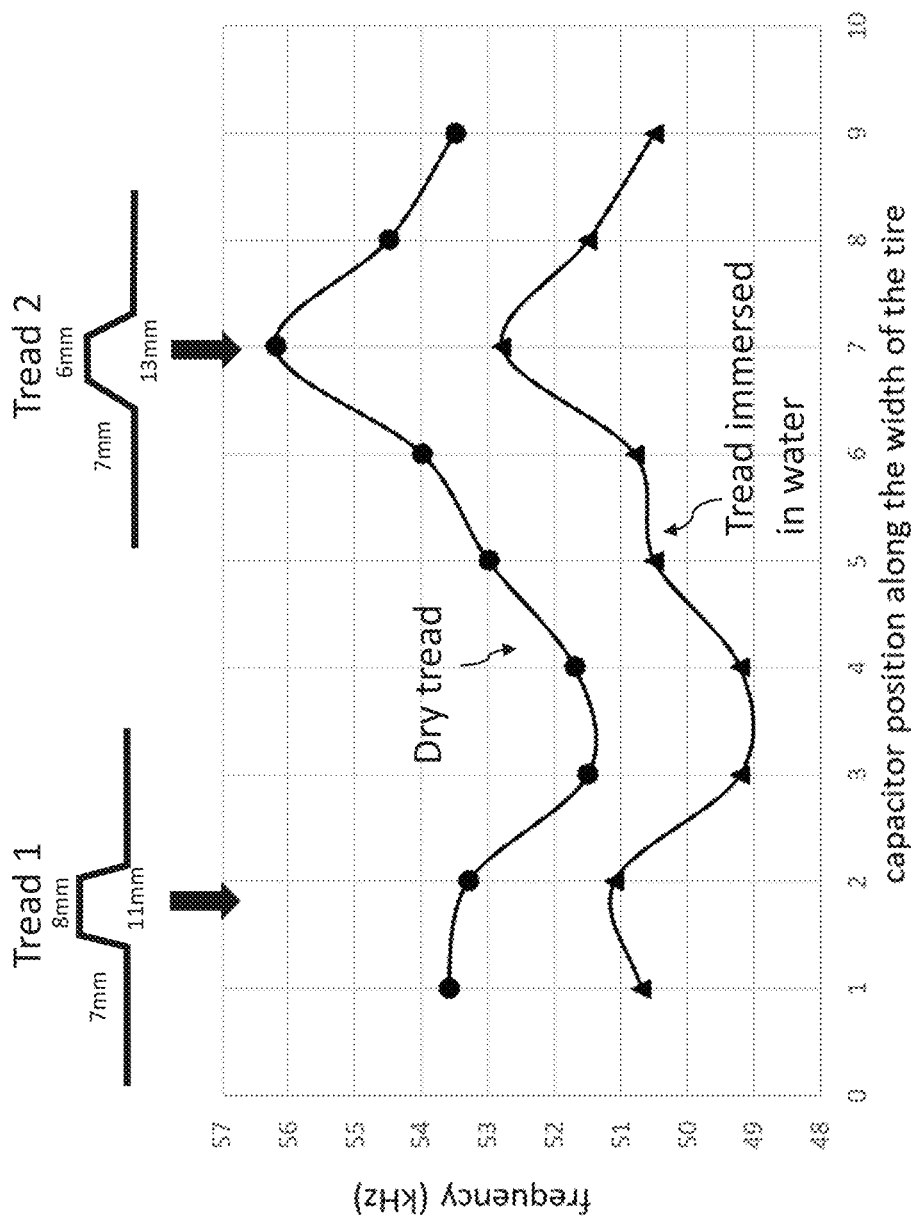
FIG. 10b shows a graph of the corresponding frequency of a 555 based oscillator corresponding to the capacitance between electrodes described in FIG. 10a for specific road wetness condition.

FIG. 10a describes embodiment of a device (14H) for measuring road conditions. The treads (811) are on the outer side (81) of tire (80) and are fully or partly filled with material (821) that may also fully or partly cover the outer area of the tire with a thin layer. Electrodes (83) are fixed along the width of the inner side of the tire (82) at location (83) with treads are located from the outer side. An oscillator (84) is connected to the electrodes through a switch box (85) such that the switch box connects, periodically, two adjacent electrodes to the oscillator such that the oscillator outputs frequency (842) that corresponds to specific adjacent two electrodes. FIG. 10b shows the corresponding frequency of the capacitance between electrodes described in FIG. 10a. The upper graph is for tire in dry conditions while the bottom graph is in case material (821) is water that covers the treads and in contact with the outer side of the tire. Since the dielectric constant of air is 1 and of water is 1.7, immersing the tread in water increases the capacitance and therefore reduces the corresponding frequency of the oscillator. It is noted that the frequency of capacitors above rubber also decreases which means that part of the electric filed propagate in the water in contact with the rubber outside treads.

Figure 11:
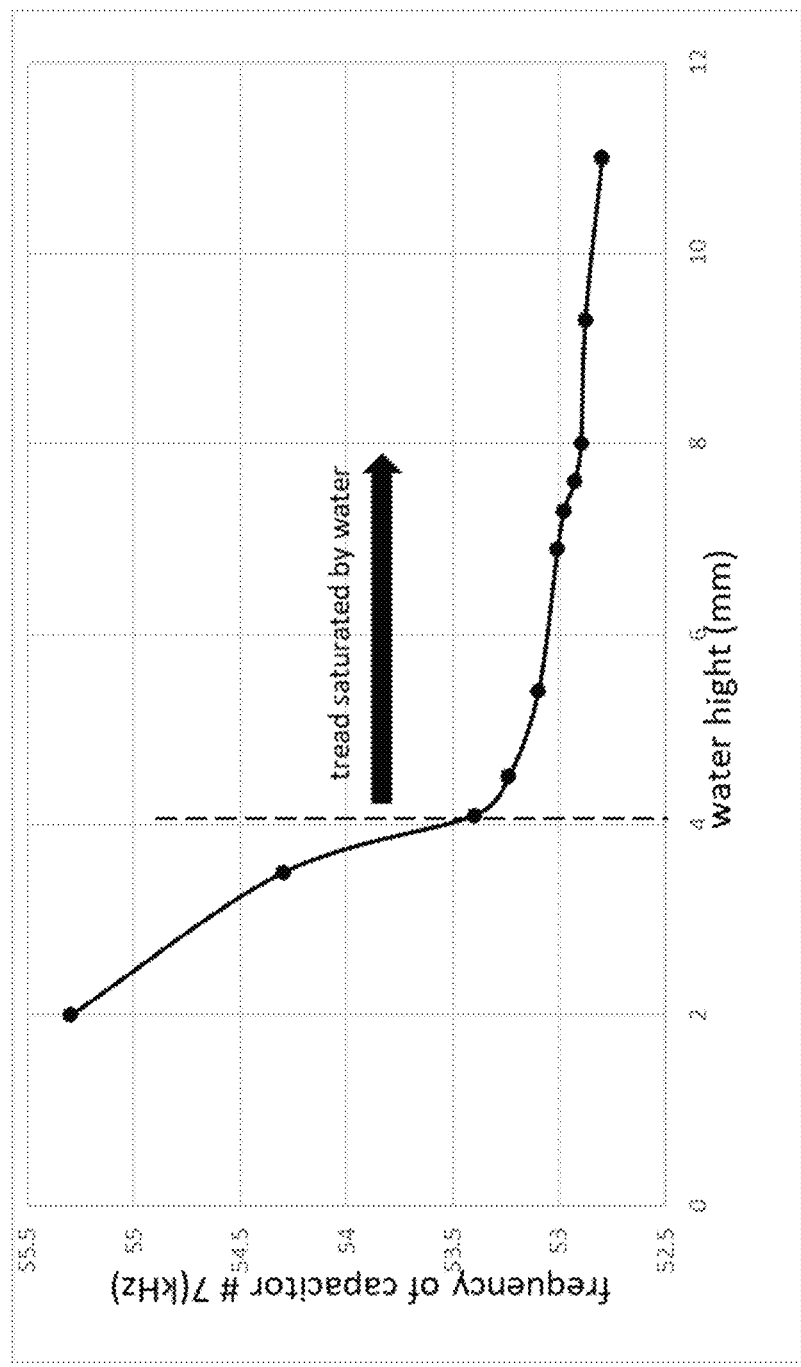
FIG. 11 shows a graph of the frequency of a 555 based oscillator corresponding as a function of water level of the capacitance between electrodes 6 and 7 that are shown in FIG. 10a and graph of FIG. 10b.

FIG. 11 shows the frequency of a 555 based oscillator corresponding to the capacitance as a function of the water level. The capacitance in this figure is between electrodes 6 and 7 shown in the FIG. 10a and in the graph of FIG. 10b. Above 4 mm water height the change in the frequency is small because the tread is completely immersed in water and change in water level has very little effect on the capacitance. Below 4 mm the effect is much more significant as the tread is partly filled with water with dielectric constant of 1.7 and partly filled with air with dielectric constant of 1. It is noted that the saturation starts at water level around 4 mm while the tread depth is 7 mm. The reason is water surface tension that pushes the water such that it fills the tread.

The electrodes rotate along with the tire are positioned for a short period of time in each turn at the bottom of the tire while the section of the tread under them the electrodes are adjacent to the road. When the road is wet these treads are filled with water that changes the dielectric constant of the treads and thus change the oscillator frequency corresponding to the electrodes. In addition, it is observed that even small layer of water causes change in the oscillator frequency and therefore even a wet tire result in a change to the oscillator frequency.

TH. ACHAMMER AND A. DENOTH in a paper titled "Snow dielectric properties from DC to Microwave X-band," pp. 92-96, Annals of Glaciology 19 1994, showed that the dielectric constant of snow depends on the snow grain size and may vary from 1.7 for new snow having grain size of 0.2 mm up to 3.5 for old snow with grain size of 1 mm. FIG. 12 shows a table of dielectric constant of different earth materials as published. The dielectric constant of dry sand ranges from 3 to 6 depending on the grain size of the send. The dielectric of water saturated sand may be as high 30, depending on the water content. In addition, it is found that the dielectric constant of ice is in the range of 3.

It is therefore possible to detect road condition depending on the change in the oscillator frequency of the corresponding capacitance of electrodes attached to a tire. This is especially important for detecting wet road, the degree of road wetness, road covered with snow or icy road. This can be done also by comparing the change in frequencies of all of the vehicle tires. For example, by noting similar change in all tires it is possible to predict that the road properties have changed and by measuring the change and with aid of software such as artificial intelligent based software, it is possible to predict the properties of the road.

The oscillator described in this patent application may be any electric oscillator including a crystal oscillator, a ceramic oscillator or oscillator comprised of electronics components such as Ring Oscillator, Colpitts Oscillator, Pierce Crystal Oscillator, CMOS Crystal Oscillator, Microprocessor Oscillator, Hartley Oscillator, RC Oscillator, Wien Bridge Oscillator, or Twin-T Oscillator or 555 timer chip configured as an oscillator.

The devices subject matter of the invention are effective both in bias ply tires and steel belted tires, but in the later the amplitude of the changes of the frequencies is less broad, so it is desirable that the analysis of these changes be more accurate and cautious.

It is understood that software such as artificial intelligent may be used to evaluate tire or road condition based on the specific data collected from the device.

It is understood that the structures, shapes, sizes, and amount of the electrodes that are described in the specification and the drawings are intended for illustrating only and in the actual application of the invention it is possible to use different structures, shapes, sized and amounts.

What is claimed is:

1. A tire with a device that is designed to check a condition of the tire or a road, wherein said device includes a first electrode and a second electrode that are fixed to internal surface of the tire, and an oscillator that is electrically connected to the electrodes so that capacitance between the electrodes affects frequency of the oscillator; wherein changes in the frequency of the oscillator can be used to identify the condition of the tire or the road;

wherein said electrodes are fixed to a specific section on said internal surface of the tire where there is a tread on outer side of said specific section, whereby a section of the tread that can be in contact with the road at any given moment can be filled with material according to the road conditions in a way that affects the capacitance between said electrodes when they are on the section adjacent to the road and consequently changes the frequencies of the oscillator; wherein the change in the oscillator frequency can be used to detect that material clings and accumulates on the tire, or fills the tread and to calculate the material level inside the tread, or to identify the material that fills the tread.

2. The tire with a device that is designed to check a condition of the tire or a road according to claim 1, wherein said changes in said frequency of said oscillator can be used to detect and calculate changes in thickness of the tire and changes in depth of treads on external side of the tire.

3. The tire with a device that is designed to check a condition of the tire or a road according to claim 1, wherein said electrodes are fixed to a specific section on said internal surface of the tire where outer side of said specific section does not come into contact with a road while driving a vehicle in which said tire is installed, and wherein said changes in said frequencies of said oscillator can be used to detect and calculate wear and tear of the tire.

4. The tire with a device that is designed to check a condition of the tire or a road according to claim 1, wherein a distance between said first electrode to said second electrode that can be changed as a results of wear and tear of the tire can change frequencies of said oscillator whereby said frequencies changes can be used to detect and calculate wear and tear of the tire.

5. The tire with a device that is designed to check a condition of the tire or a road according to claim 1, wherein said oscillator is kind of a Ring Oscillator, Colpitts Oscillator, Pierce Crystal Oscillator, CMOS Crystal Oscillator, Microprocessor Oscillator, Hartley Oscillator, RC Oscillator, Wien Bridge Oscillator, or Twin-T Oscillator or 555 timer chip configured as an oscillator.

6. A tire with a device for measuring tire thickness, wherein said device includes a first electrode and a second electrode, a measuring device, an alternating power source, and an inductor;

wherein said electrodes are fixed to internal surface of the tire;

wherein said measuring device is connected in parallel to the electrodes and is designed to measure alternating voltage between the electrodes;

wherein a first terminal of the alternating power source is electrically connected to a first terminal of the inductor, and a second terminal of the alternating power source is electrically connected to the second electrode;

wherein a second terminal of the inductor is electrically connected to the first electrode;

wherein the alternating power source can induce electrical voltage at varying frequencies in a way that enable the measuring device to detect a peak of the alternating voltage on the electrodes, or induce a voltage or current pulse that causes an alternating current to flow between a capacitance formed between the electrodes and the inductor in a certain oscillating frequency; and wherein changes in said peak alternating voltage or changes in a frequency of said alternating current can be used to detect and calculate changes in thickness of the tire and changes in depth of treads on outer side of the tire.

7. A tire with a system for detecting and measuring road conditions, wherein said system includes a plurality of electrodes that are fixed to a specific section on internal surface of the tire where there is a tread on outer side of said specific section, a switching system, and an oscillator; wherein the switching system is designed to electrically connect, on different occasions, different two adjacent electrodes from said plurality of electrodes to the oscillator;

whereby when the tire is coated by a layer of material according to the road condition or when the tread section that is in contact with the road at any given moment is at least partly filled with the material according to the road conditions; wherein said material can affects the capacitance between at least two adjacent electrodes from said different two adjacent electrodes and consequently change the frequency of the oscillator and wherein the change of the oscillator frequency can be used to detect that material clings and accumulates on the tire, or fills the tread and to calculate the material level inside the tread, or to identify the material that fills the tread.

8. The tire with a system for detecting and measuring road conditions according to claim 7, wherein said oscillator is kind of a Ring Oscillator, Colpitts Oscillator, Pierce Crystal Oscillator, CMOS Crystal Oscillator, Microprocessor Oscillator, Hartley Oscillator, RC Oscillator, Wien Bridge Oscillator, or Twin-T Oscillator or 555 timer chip configured as an oscillator.

* * * * *